(12) United States Patent
Hawkins

(10) Patent No.: US 6,536,035 B1
(45) Date of Patent: Mar. 18, 2003

(54) LOADING SOFTWARE FILES IN CLIENT-SERVER AND OBJECT ORIENTED ENVIRONMENT

(75) Inventor: John Christopher Hawkins, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/390,057

(22) Filed: Sep. 3, 1999

(30) Foreign Application Priority Data

Dec. 9, 1998 (GB) .............................. 9820178

(51) Int. Cl.$^7$ .............................................. G06F 9/44
(52) U.S. Cl. ....................... 717/100; 917/108; 707/204
(58) Field of Search ................................ 717/100, 101, 717/108, 116, 147, 148, 165, 127, 128, 129, 178; 707/204, 103, 203

(56) References Cited

U.S. PATENT DOCUMENTS

| | | | | |
|---|---|---|---|---|
| 5,583,983 A | * | 12/1996 | Schmitter | 717/138 |
| 5,630,131 A | * | 5/1997 | Palevich et al. | 717/108 |
| 5,668,998 A | * | 9/1997 | Mason et al. | 717/104 |
| 5,956,733 A | * | 9/1999 | Nakano et al. | 707/204 |
| 5,966,702 A | * | 10/1999 | Fresko et al. | 707/1 |
| 5,978,477 A | * | 11/1999 | Hull et al. | 358/403 |
| 6,052,525 A | * | 4/2000 | Carlson et al. | 717/100 |
| 6,074,434 A | * | 6/2000 | Cole et al. | 717/173 |
| 6,182,277 B1 | * | 1/2001 | DeGroot et al. | 717/115 |
| 6,202,070 B1 | * | 3/2001 | Nguyen et al. | 707/104 |
| 6,209,128 B1 | * | 3/2001 | Gerard et al. | 717/108 |
| 6,223,343 B1 | * | 4/2001 | Hopwood et al. | 717/101 |
| 6,332,217 B1 | * | 12/2001 | Hastings | 717/178 |
| 6,353,926 B1 | * | 3/2002 | Parthesarathy et al. | 717/173 |
| 6,453,469 B1 | * | 9/2002 | Jystad | 717/174 |

OTHER PUBLICATIONS

Price et al., "Producing reusable object oriented components: a domain and organization specific perspective", ACM SSR, pp 41–50, May 2001.*

Ravat et al., "Towards daa warehouse design", ACM CIKM, pp 359–366, Nov. 1999.*

Maheshwari et al, "Collecting distributed garbage cycle by back tracking" ACM PODC, pp 239–248, 1997.*

Wada et al, "Object groups and group communication in a distributed object oriented programming", IEEE Database & Expert system applications Proc. 9th int. workshop, pp 461–466, 1998.*

* cited by examiner

Primary Examiner—Anil Khatri
(74) Attorney, Agent, or Firm—Steven W. Roth

(57) ABSTRACT

A tool operable within an integrated development environment for client-server object oriented applications is disclosed. The tool analyzes a running application to trace the first instantiation of classes within the application; groups classes according to when they are first instantiated into respective groups; and means archives these groups into respective archive files capable of being decoded prior to execution of the application on a client.

10 Claims, 2 Drawing Sheets

```
time    Program Execution
 |
 |      Object1 = new Class1  }
 v      Object2 = new Class2  }  file #1 [Class1,Class2]

.
              .
           processing
              .
              .

Object3 = new Class1  }
        Object4 = new Class3  }  file #2 [Class3]

.
              .
           processing
              .
              .

Object5 = new Class2  }
        Object6 = new Class4  }  file #3 [Class4]
``` time Program Execution

Object1 = new Class1
Object2 = new Class2         } file #1 [Class1,Class2]

.
.
processing
.
.

Object3 = new Class1
Object4 = new Class3         } file #2 [Class3]

.
.
processing
.
.

Object5 = new Class2
Object6 = new Class4         } file #3 [Class4]

| time | Use Case #1 | Use Case #2 |
|---|---|---|
| ↓ | Class1, Class2 | Class1, Class2 |
| | . | . |
| | . | . |
| | . | Class 3 |
| | Class 3 | . |
| | . | . |
| | . | . |
| | . | Class4, Class7 |
| | Class4 | . |
| | . | . |
| | . | . |
| | . | Class6 |
| | Class5 | |

LOADING SOFTWARE FILES IN CLIENT-SERVER AND OBJECT ORIENTED ENVIRONMENT

FIELD OF THE INVENTION

The present invention relates to a tool operable within an integrated development environment for client-server object oriented applications and a method for dividing application software into archive files for decoding prior to execution on a client.

BACKGROUND OF THE INVENTION

Client machines connected to the Internet run Web browsers which generally operate by establishing a TCP/IP connection with a server web site and downloading files written in hyper-text mark-up language (HTML) from the web site. Java enabled browsers running on conventional type personal computers include a Java Virtual Machine (JVM) in which Java byte-code is executed within the browser. More recently, however, dedicated Java Machines, such as Palm-top computers have become available, and the present invention is beneficial in both environments. In any case Java enabled browsers are responsive to "applet" tags within HTML files to allocate an area of a desktop display within which an applet can operate, and to download the necessary class files required to execute the applet. The class files to be downloaded depend on the objects instantiated during applet program execution. A menu based program will usually cause a number of menu objects to be instantiated and so menu class files need to be downloaded. Similarly, graphics type applets will require graphic classes. It is acknowledged that class files may be cached on a client machine prior to applet execution, but the benefits of caching to class download time are not of concern in relation to the present disclosure and in any case are in addition to the benefits provided by the present invention.

There are three ways to run an applet within a browser environment. They all center around the applet tag and how the browser is to continue when it sees one. The simplest method simply holds a reference to the first class that is to be called:
<applet code=COM.ibm.test.TestApplet.class width=280 height=30">

This is essentially a reference to the "main" method of the TestApplet class. When Java wishes to run the applet it goes back to the server and requests the TestApplet class. As the class is loaded into the JVM, the JVM parses the class and looks at the referenced classes within the class, that is, the classes required when new objects are instantiated, for example, "Object1=new Class1". The JVM then spawns off separate threads to load these classes from the server and repeats the process until no more classes are required.

Each thread loads its classes using the hyper-text transfer protocol (HTTP) to communicate with the server. HTTP is primarily a stateless protocol and is a relatively slow way to download information as it requires a TCP/IP connection to be set-up between client and server for each request/response couple in a transaction. Also, the downloaded classes which comprise Java byte-code are not compressed and so this adds to the inefficiency of the protocol for transferring this type of information.

The second method of loading a set of classes tries to overcome these problems by putting all of the necessary files into an archive file. For Java the file is referred to as a 'jar' file and archiving classes is referred to as 'jarring'. A similar Microsoft system is available where the necessary files are put into "CAB", cabinet files. For Java, however, the tag looks something like this:
<applet code=COM.ibm.test.TestApplet.class archive= TestAppletArchive.jar width=280 height=30">

The concept here is that the JVM sees the applet tag and sees that the class is held within the archive file. Therefore it attempts to load the jar file. From that point onwards the applet has (if the jar file has been correctly made) all of the necessary files that it requires to execute so no more loading is required.

The third potential way that class files can be introduced into the JVM is via a number of jar files where the application has been divided manually by a developer. The tag looks something like this:
<applet code=COM.ibm.test.TestApplet.class archive= TestAppletArchive.jar,TestAppletSecondJar.jar width= 280 height=30">

The JVM runs as before but when the JVM runs out of classes, during the execution of classes from the first jar, the JVM goes off and loads the second jar file to see if the required classes are in there and so on if other files are listed. If none contain the required class, then the program fails.

Presently, creating and loading jar files relies to a great extent on what is within the jar file. This is obviously fine so long as the jar file doesn't get too large and therefore take a great deal of time to download before the application can start working. With the coming of larger and larger applications which are being placed in jar files, there has come the problem that applications are having larger and larger lead in times. This is generally unacceptable to the vast majority of users who want local application response times even in an Internet environment.

It is not beneficial, however, to simply divide source code from top to bottom into blocks and to archive classes required for these individual blocks because this does not take into account the order in which classes are required at run-time.

Integrated development environments (IDE) are available to enable developers to visually build applications, in particular Internet applications. Examples are, IBM VisualAge from International Business Machines Corporation or Java Bean Machine from Lotus Corporation for Java based applications or Microsoft Visual Studio for developing, ActiveX applications in particular. IDE's like IBM VisualAge provide an export facility allowing a developer to 'jar' or in the Microsoft case 'cab' an application once it has been written. Another common feature of IDE's is that once a developer has authored an application, it is possible to run the application within the IDE. IDEs to one extent or another also allow developers to debug programs by tracing program execution in some cases, such as IBM VisualAge, at a source code level.

In a first aspect, the present invention makes use of IDE tracing techniques to monitor the execution sequence of an application in particular to determine when objects are instantiated from given classes for the first time.

SUMMARY OF THE INVENTION

Thus, the present invention provides a tool operable within an IDE for client-server object oriented applications, said tool comprising: means for analysing a running application to trace the first instantiation of classes within the application; means for grouping classes according to when they are first instantiated into respective groups; and means for archiving said groups into respective archive files capable of being decoded prior to execution of said application on a client.

The present invention overcomes the problems of the prior art by looking at more than just what files are needed in an archive file and addressing the problem of what files are needed and in which archive file. The invention enables an application developer, for example, to give the user a logon screen or a small piece of the application immediately whilst downloading the rest of the application from another archive file in the background. This fulfils the requirement of the user to have immediate availability of something to do with an Internet application as well as minimizing the amount of code downloaded and so saving on network bandwidth.

In a preferred embodiment, the tool adapts the developer's application source code to include class file pre-loading code, so that archive files including classes to be required later in program execution are downloaded beforehand to further reduce application response time.

BRIEF DESCRIPTION OF THE DRAWING

An embodiment of the invention will now be described with reference to the accompanying drawings, in which.

DESCRIPTION OF THE PREFERRED EMBODIMENTS

The invention comprises a tool operable within an IDE environment which includes a program analysis component that looks at an application program executing. The preferred embodiment overcomes two problems to implement the present invention:

a. Splitting of the jar in such away as to be beneficial to the user; and b. Coding of the jar to ensure that the system does not break down due to lack of class files.

Splitting of the Jar in such a Way as to be Beneficial to the User

The tool analyses potential splits in the code using combinations of three methods:

Determining where there is a logical break in the program, for example, if there is a large amount of user-interaction requiring time to be spent keying, choosing etc. Finding these breaks in a program could be done manually but is preferably done using tracing techniques. During tracing, the tool looks at a set of test cases where a user runs the application and then notes time periods where no new classes are being instantiated.

It will be seen that a first instantiated class may in fact extend one or more superclasses. The byte-code for any class tells the analysis tool if any superclasses are required by an application. If so, then any such superclasses which have not been previously referenced are considered to be first instantiated along with the originally instantiated class and so will also need to be downloaded. For the purposes of simplicity, however, the present description refers to a first instantiated class and all its previously unreferenced superclasses by a single name.

Figure 1:
FIG. 1 shows program execution for code to be jarred according to the invention.

So, given the code of FIG. 1, program execution begins and the first object to be instantiated is Object1 of type Class1, next Object2 of Class2 is instantiated. Thereafter, a number of processing steps take place where no objects are instantiated from previously unreferenced classes. If these steps require user interaction, such as waiting for a keystroke or a mouse click, or carry out many calculations, then the processing steps will create a relatively long break in time between the instantiation of Object2 and Object4. Once Object4 is instantiated, a further break in time without requiring new classes takes place until Object6 is instantiated.

Take for example, when a menu based applet runs the user receives a login screen, he fills this in and then he gets to another screen requiring input, then the program does a processor intensive operation before the user views some results and the program dies. Here, there are 4 distinct elements to the program. If an archive file were loaded for the login screen then another for the second screen and perhaps even a third and fourth for the two last elements, performance for the user could be greatly improved. There are already "natural" breaks in the flow of execution and so when the flow of code being executed is analysed temporally, a clear flow of peaks and troughs can be determined. The tool then ties this to the concept that at certain times, the application uses classes that are already loaded, so that it comes up with an estimate of where jar file creation can be optimized.

Figures 2, 3:
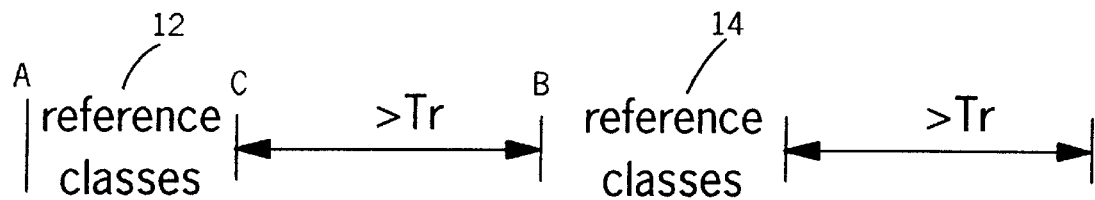
FIG. 2 shows a time line illustrating processing breaks.
FIG. 3 shows two different use cases of a program executing.

Referring now to FIG. 2, if we define a processing break as a period of time when no classes are first referenced, then if a processing break is likely to exceed the amount of time Tr required to load classes first referenced since a previous such processing break, then these first referenced classes could beneficially be archived into the same file.

If these archived files are listed in an applet tag in the manner described above, then the JVM would begin to download the archive file for first referenced classes 12 at time A, this being the point where the JVM would discover it needed the first of these classes. Similarly, the JVM would begin to download the archive file for first referenced classes 14 at time B. This would have benefits for the user in terms of reduced lead-in time before an application began to respond as well as requiring, to a large extent, only the downloading of classes required at run-time. Again, it should be noted that these benefits are over and above those provided by caching, which may in fact mean that classes are not required until later, if at all, in program execution and may provide improved response time.

The analysis tool can be turned on within an IDE such as IBM VisualAge by setting a "jar optimize" flag, much the same as turning on a "debug" flag, before application program execution. Alternatively, the tool can be launched-from a tool bar icon causing it to analyse the current application and generate the required jar files in one step. The case above is extremely simple, but in more complex applications where the flow of execution potentially has many branches, then the number of test cases has to be increased.

In complex applications, as the objects being instantiated from one use case to another as well as the relative timing of their instantiation varies, the analysis tool needs to find an optimum archiving solution. In the above case which is so simple and there are no "branches" and merely delays, analysis of one use case should make a best guess at which order to load the classes. If however, as in FIG. 3, the times for class instantiation overlap and vary from one use case to another, then the archiving needs to correlate these times to groups classes in a manner suiting each use case.

In FIG. 3, take each line as a time unit, and say for example that it takes a thread 3 time units to load required classes. For use case #1, optimally 4 archive files containing Class1 and Class2; Class3; Class4; and Class5 respectively would be created. This would allow ample time within intermediate processing periods to load the required classes or, even if classes were not pre-loaded, they would be beneficially grouped together into complementary archive files. It can be seen, however, that there is not a large enough break between the instantiation of Class1, Class2 and Class3 in use case#2 to allow for separate pre-loading of Class3 as well as the fact that different classes are required for use case #2. Thus, based on these two use cases, an optimal solution is to create three archive files containing Class1, Class2 and Class3; Class4, Class5, Class6 and Class7 respectively.

A second method for determining the division of archive files relies on determining distinct categories of users who only require certain elements of the application code. For example, for a pay-per-view service, a user may only be allowed to access certain elements of the code anyway so segmenting of the code into generic components and those which are applicable to certain services can be done. For this case, the analysis tool can be built around use cases as above or done manually with help from a parser ensuring that all classes are available in the JVM when required.

If an application does not fall into either of the other two categories then the application can still be considered to have some features that would be available before others. For example, in a menu system, the classes that are required for the options that are available at the top level are downloaded in a first jar file then, in the background, the code that is applicable at a lower level of the menu hierarchy is downloaded. This is a case again where a parser could have a good guess at which classes to load and then a set of use-cases could be added if necessary.

Coding of the Jar to Ensure that the System does not Break Down Due to Lack of Class Files In a preferred embodiment, the analysis tool puts some generic classes into the first jar file to be downloaded for an application. These classes are programmed to load classes in the correct time order. Preferably, these classes contain a digest of the class grouping data extracted above. The class loading classes run in the background and simply request classes from the correct files when they sense during application program execution that the time has come. Preferably, "load points" are automatically coded into the applications source code files themselves. This function is preferably integrated into the analysis tool described above so that the developer never sees this code but it is automatically introduced as Visual Age is jarring up the applet.

Thus in the example of FIG. 1, the class loading classes would be included in archive file #1. Immediately, after the instruction instantiating Object2, a piece of code spawning a thread which downloads archive file #2 is inserted by the analysis tool. The simplest piece of code which will cause the downloading of archive file #2 relies on just creating a reference to a class included in this archive. Thus, assuming that the class com.ibm.myclasses.X is in an additional Jar which needs to be pre-loaded, the applet could spawn another thread by having the following statement included:

Class x=Class.forName("com.ibm.myclasses.X");

This creates a class object x to represent the class com.ibm.myclasses.X. In order to do this it has to locate, load and link the class and thus will cause the new jar file to be loaded.

Similarly, after the instantiation of Object3, a corresponding piece of code for downloading archive file #3 is inserted. These threads thus download the required archive files before they are needed during a period of local processing, such as user interaction, on the client machine.

Taking the example of FIG. 2, using the class pre-loading technique, only the initial archive file needs to be referenced in the applet tag. The JVM then spawns threads to pre-load the remaining archive files at the load points inserted within the application. Thus, the JVM begins to download the archive file containing the classes 14 at time C, so that the classes are already available when first referenced at time B. Thus, the required classes should be available beforehand and response time is improved further.

While the present description has emphasised the benefits of the invention for Jar files, the invention is not limited to this form of archive files, for example, CAB files are also contemplated. Similarly, the invention has been described as operating within a Java Virtual Machine or a Java Machine. The invention is not limited, however, to such an environment and as equally applicable to any client environment for executing programs downloaded from a server at run-time. The term decoded should be interpreted in its broadest sense to cover both decompression and decryption of files or any other processing necessary to enable the archive file to operate on the client machine.

What is claimed is:

1. An apparatus within an intergrated development environment for client-server object oriented applications, said apparatus comprising:

means for analysing a running application to trace the first instantiation of classes within the application;

means for grouping classes according to when they are first instantiated into respective groups; and means for archiving said groups into respective archives files capable of being decoded prior to execution of said application on a client.

2. An apparatus as claimed in claim 1 wherein said analysing means is adapted to determine respective times when classes are first instantiated by said application running within said development environment and to group classes instantiated at similar times together.

3. An apparatus as claimed in claim 2 comprising means instantiable to execute said application more than once and wherein said grouping means is adapted to correlate respective times when classes are first instantiated and to group said classes according to said correlated times.

4. An apparatus as claimed in claim 1 said application is a pay-per-view application in which a plurality of groups of users have respective access rights to groups of classes and wherein said grouping means is adapted to group classes to which an associated group of users has access together.

5. An apparatus as claimed in claim 1 wherein said application is a menu-driven application and wherein said grouping means is adapted to group-classes required by different menu options together.

6. An apparatus as claimed in claim 1 comprising means instantiable to adapt an application to include a class loading means, said class loading means being instantiable to loading an archive file containing a group of classes at a point in said application after a last class in a previously loaded archive file is instantiated.

7. The apparatus of claim 1 being included in an integrated development environment.

8. An apparatus as claimed in claim 1 wherein said client runs a web browser and downloads said archive files across the Internet.

9. A computer-implemented method for dividing application software into archive files for decoding prior to execution on a client, said method comprising the steps of:

analysing a running application to trace the first instantiation of classes within the application;

grouping classes according to when they are first instantiated into respective groups; and archiving said groups into respective archive files capable of being decoded prior to execution of said application on a client.

10. A program product, said program product being stored on a computer readable storage redium and being configured to carry out the steps of:

analysing a running application to trace the first instantiation of classes within the application;

grouping classes according to when they are first instantiated into respective groups; and archiving said groups into respective archive files capable of being decoded prior to execution of said application on a client.

* * * * *